United States Patent
Robles-Flores et al.

(10) Patent No.: US 8,224,115 B2
(45) Date of Patent: Jul. 17, 2012

(54) DEVICE, SYSTEM AND METHOD FOR IMPROVING IMAGE QUALITY BY ADDRESSING IMAGE NOISE FROM ELECTRICAL NOISE

(75) Inventors: Eliud Robles-Flores, Webster, NY (US); Dale Mashtare, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 822 days.

(21) Appl. No.: 12/363,909

(22) Filed: Feb. 2, 2009

(65) Prior Publication Data

US 2010/0195930 A1 Aug. 5, 2010

(51) Int. Cl.
*G06K 9/40* (2006.01)

(52) U.S. Cl. ........................ 382/275; 358/463

(58) Field of Classification Search .................. 382/260, 382/261, 274, 275; 358/463; 348/607
See application file for complete search history.

(56) References Cited

U.S. PATENT DOCUMENTS

| | | | | |
|---|---|---|---|---|
| 5,003,618 | A | * | 3/1991 | Meno ............................ 382/261 |
| 5,046,118 | A | * | 9/1991 | Ajewole et al. ............... 382/169 |
| 5,105,451 | A | * | 4/1992 | Lubinsky et al. ............... 378/28 |
| 2008/0315879 | A1 | * | 12/2008 | Saha ............................ 324/318 |
| 2010/0046709 | A1 | * | 2/2010 | Ueki ............................. 378/98 |

FOREIGN PATENT DOCUMENTS

WO WO 2006075546 A1 * 7/2006

* cited by examiner

*Primary Examiner* — Jon Chang
(74) *Attorney, Agent, or Firm* — Oliff & Berridge, PLC

(57) ABSTRACT

Provided are devices, systems and methods that improve image quality by identifying and addressing image noise caused by electrical noise. Electrical noise emanating from a plurality of components of an image apparatus is identified, producing an electrical noise detection calculation based on the detected electrical noise, and inputting the electrical noise detection calculation into an image noise correction calculation apparatus, calculating an image noise correction calculation.

23 Claims, 6 Drawing Sheets

DEVICE, SYSTEM AND METHOD FOR IMPROVING IMAGE QUALITY BY ADDRESSING IMAGE NOISE FROM ELECTRICAL NOISE

BACKGROUND

The exemplary embodiments relate to imaging. In particular, the exemplary embodiments are directed towards devices, systems and methods that improve image quality by identifying and addressing image noise caused by electrical noise.

SUMMARY

Image quality is impaired by image noise. Image noise is a conglomerate of different artifacts relating to image quality, including: banding, streaking, mottle, graininess, etc. High frequencies of these patterns throughout a print leads to poor image quality.

It has been observed that electrical boards or high voltage components that are not properly grounded, can create electrical noise. Electrical noise that makes its way back into the system has been found to induce image quality artifacts.

These systems are hard to diagnose. Because the systems are so complex, image artifacts can be induced by many factors. Typically, a service representative must manually go through a long checklist to determine what the problem is. In practice, checking systems for electrical noise is usually one of the last things that is checked because of its complexity, however, the influences of electrical noise are nonetheless significant.

The following disclosure proposes devices, systems and methods monitoring electrical noise through at least the frames of the machines and run paths, and feeding data back to the control system to help fix the origin of the electrical noise, prevent the production of the electrical or compensate for these artifacts in the actual imaging.

In an exemplary embodiment, an electrical noise detection apparatus detects electrical noise from a plurality of components of the image apparatus and produces an electrical noise detection calculation. An image noise calculation apparatus, calculates an image noise correction calculation based at least on the electrical noise detection calculation.

In another embodiment, the electrical noise detection apparatus includes a plurality of sensors sensing electrical noise. In yet another embodiment, the electrical noise detection apparatus has a sensor for each high-voltage component of the image apparatus.

In another embodiment, the image noise correction calculation is entered into an output apparatus. In another embodiment, the image noise correction calculation is input into a toner reproduction curve apparatus.

In another embodiment, the image noise correction calculation is directed to a troubleshooter in relationship with the plurality of components of the image apparatus. The troubleshooter addresses the image noise by at least one of: fixing the electrical noise, compensating for the image noise and shutting down a source of the electrical noise, within the plurality of components of the image apparatus. In another embodiment the image noise correction calculation is directed to a troubleshooter in relationship with a central controller of the image apparatus, wherein the central controller addresses the electrical noise by at least one of: fixing the electrical noise, compensating for the image noise, shutting down a source of the electrical noise within the plurality of components of the image apparatus, and sending an alert to the operator of the image apparatus.

These and other features are described in, or are apparent from the following detailed description.

BRIEF DESCRIPTION OF THE DRAWINGS

Various exemplary details are described, with reference to the following figures, wherein.

DETAILED DESCRIPTION

Figure 1:
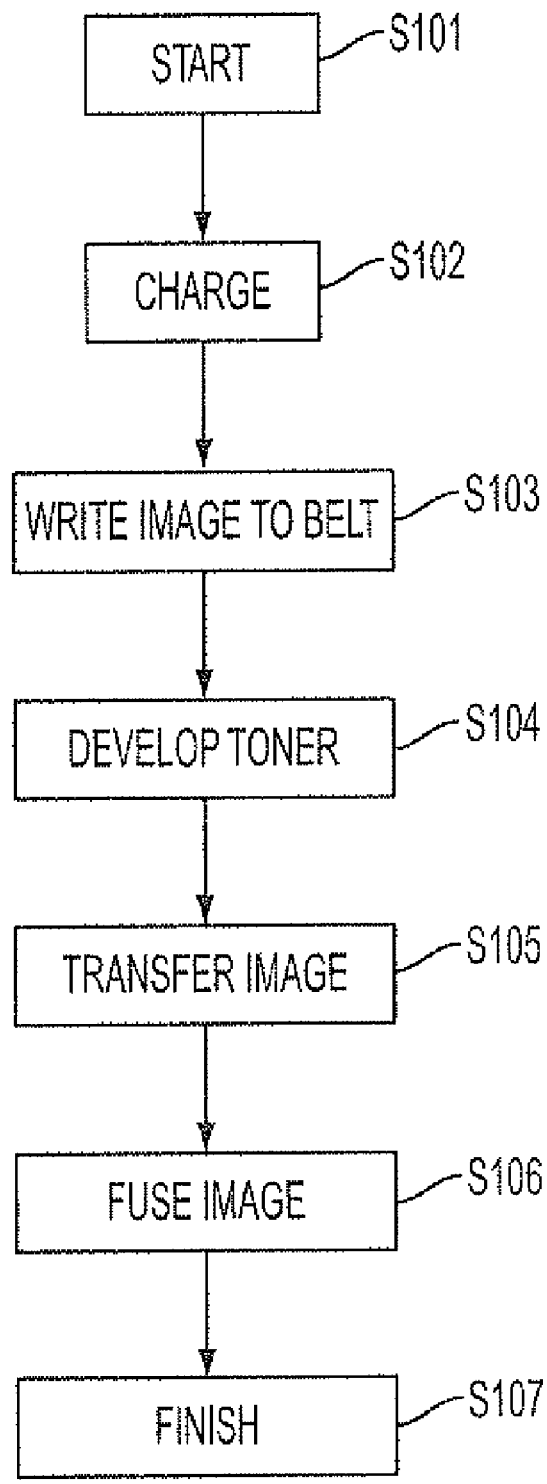
FIG. 1 illustrates an image writing process.

An image apparatus may be any apparatus that allows input of an image and/or output of an image. These may include printers, copiers, facsimile machines, scanners, etc. A goal of at least improving image quality output is accomplished by targeting electrical noise caused by various components of the image apparatuses. An output apparatus associated with the image apparatus may include features such as image generating, image displaying, image reproduction, image facsimileing, image copying, image development, image scanning or image printing.

An electrical noise detection apparatus may be a single device that is engaged with other components of the image apparatus. Components of the image apparatus may include high-voltage power supplies, other high-voltage components, as well as ground paths, circuit boards, etc. The electrical noise, once recognized by the electrical noise detection apparatus, may yield an electrical noise detection calculation. The electrical noise detection calculation is at least based on the electrical noise that is detected from the various components of the image apparatus. The electrical noise detection apparatus may include a plurality of sensors sensing electrical noise. The sensors may be in relationships with one or more components of an image apparatus. Key factors to be factored into electrical noise detection calculation include frequency and amplitude of the electrical noise. Further, a way of including color as a factor would be important in computing such a calculation.

An image noise correction calculation apparatus calculates an image noise correction calculation at least based on the electrical noise detection calculation. This image noise correction calculation may be used in a variety of ways to address the image quality that may be output by the image apparatus. The image noise correction calculation that is computed may be entered into a troubleshooter. The image noise correction calculation may be entered into a toner reproduction curve apparatus.

A troubleshooter may be a component of an image apparatus or an exclusively separate device. The troubleshooter, when placed in relationship with the components of the image apparatus may: identify the sources of the electrical noise, fix the sources of the electrical noise, suppress or disable the source of the electrical noise, compensate for the image noise that is caused by the electrical noise, alert a user of the image apparatus, or any of the multiple combinations of that which is listed, and the like. The troubleshooter may perform these tasks itself, it may be automated through a central controller, or it may be enabled by an individual using the device. The troubleshooter may counteract the electrical noise by sending counter noise back to the sources of the electrical noise. Additionally, once the sources of the electrical noise are identified, it may be possible to recommend a variety of courses of action to address the electrical noise, including, but not limited to: cleaning, replacing, or repairing the source of the electrical noise.

A toner reproduction curve apparatus may include a variety of actuators. One of those actuators may be a Raster Output Scanner (ROS). A ROS may write images on image belts, that may subsequently write images onto a substrate. A substrate may be one of paper, transparencies, photographs, and a variety of other writable media. A ROS may be a laser. For example, Electrical noise is known to cause banding, especially when due to loose card cages or breakdown from HV wired to frames. The ROS may be used to counteract banding. Banding, especially high-frequency banding, is known to carry signatures and a ROS may be utilized to address and counteract such banding. As a way of counteracting the banding, the ROS may initiate a counter acting banding, in order to offset the banding that is caused by the electrical noise.

In some image apparatuses, high-voltage power supplies (HVPS) create a large amount of electrical noise. Many HVPS have what is called the charging step, where high voltage devices are used to ionize air. This is one of the key areas where some of this noise is hard to control, and the noise eventually gets out to other areas of the image apparatus. In some charging steps, a tungsten wire, has a voltage applied to it and after about 3,000 to 4,000 volts, the air gets ionized. Air is broken down and ions of the air is created, which can be used to drive a charge to a printing belt. HVPS may also be used in the development process, although their voltage settings may not be as high as in the charging steps.

In some image apparatuses, the electrical noise detection apparatus may be a tool that detects responses from all of the components of the apparatuses. The electrical noise detection apparatus may turn on devices, possibly one by one, or more than one, in order to observe if electrical noise is being generated. In particular, a situation where an artifact is produced in the image output, a reverse diagnosis would be possible to see if electrical noise, at all, is causing the image noise.

FIG. 1 is one possible basic process by which an apparatus could record an image on a medium. An image to be written is first presented to the apparatus, initializing its processes (S101). From there a belt is charged, as described above (S102). An image is then written to the belt with a TRC apparatus (S103). A ROS may be used to write images or image belts. Subsequently, there is a development step, where the toner is developed (S104). Finally, the image is transferred fused to the recording medium (S105 and S106), at which time the image processing is complete (S107).

With respect to FIG. 1, electrical noise, can affect any of those steps except fusing. For example, while it is always desirable to have uniform charging throughout the belt, if in the charging process, some leakage were to go through the system, nonuniformities may be induced as part of the charging process. Further, with respect to a ROS, while a ROS can be used to counteract the effects of electrical noise, within its normal operation, a ROS may actually induce instabilities that could result in nonuniformities. With respect to the development step, this step is generally less susceptible to be a cause of electrical noise because there are more overpowering processes being performed. However, with a system as described herein, the development steps are less likely to be overlooked, these steps are still a possible source of disruptive image noise. With respect to transfer, which is how the image is transferred from the belt to the medium, the transfer area is another exemplary area where it may be necessary to monitor the potential electrical noise. As illustrated in FIG. 1 and the preceding description, there are a number of components of the xero-graphic process, which is why it is desirable to monitor the power supplies, the boards, the ground paths, and other components to counteract the undesirable artifacts.

Figure 2:
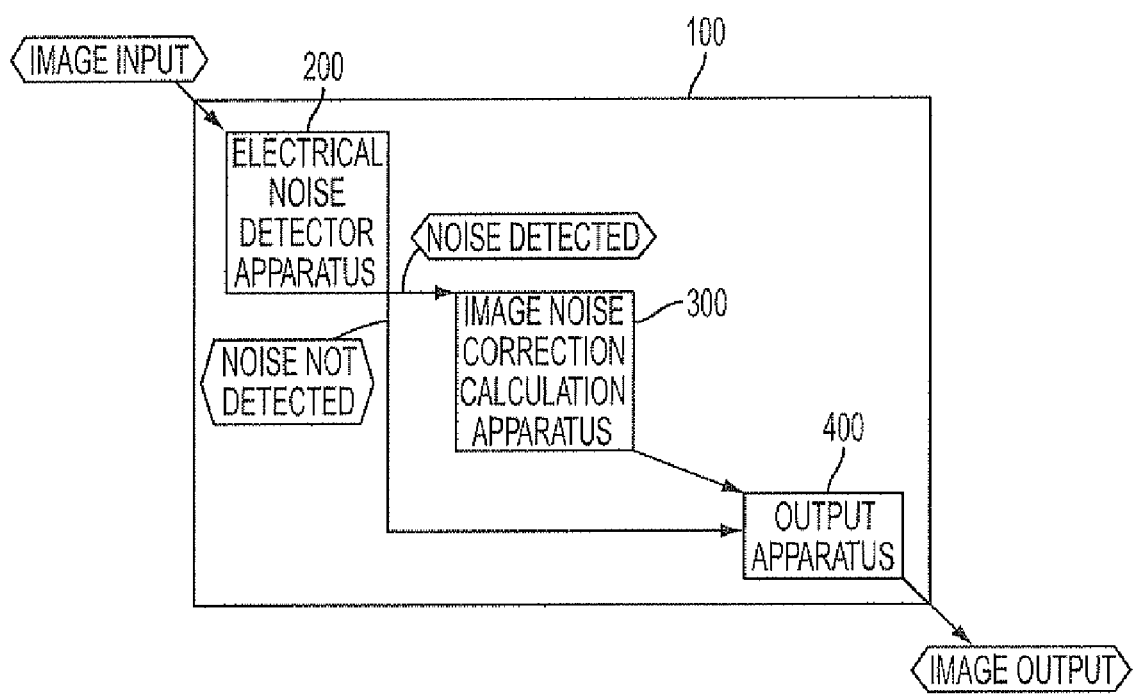
FIG. 2 is a diagram of an image apparatus that processes an image according to an exemplary embodiment.

In the embodiment of FIG. 2, an image to be processed is entered into the image apparatus 100. An Electrical Noise Detection apparatus 200 (END apparatus) observes electrical noise that is being produced. If the END apparatus 200, does not recognize the presence of any electrical noise, the image is allowed to proceed to an output component of the image apparatus. However, upon recognition of electrical noise in any component of the image apparatus, the END apparatus proceeds to calculate an electrical noise detection calculation (END calculation). The END calculation is then directed to an image noise correction calculation apparatus 200 (INCCA). The INCCA calculates an image noise correction calculation (INCC). Also, the END apparatus 300 and the INCCA 300 may or may not be separate units. An output device 400 may output the image in a variety of different outputs.

In calculating the END calculation, the END apparatus 200 may take into account a variety of inputs relating to electrical noise. For example, frequencies and amplitudes of the electrical noise will be factored into the calculation. As is later disclosed, the END calculation may include factors that are looped back to the END apparatus 200, such as recognition of image noise that is realized by downstream portions of the image apparatus, such as, but not limited to an image display, an image preview display, an image preview apparatus, or even a user of the image apparatus.

Figure 3:
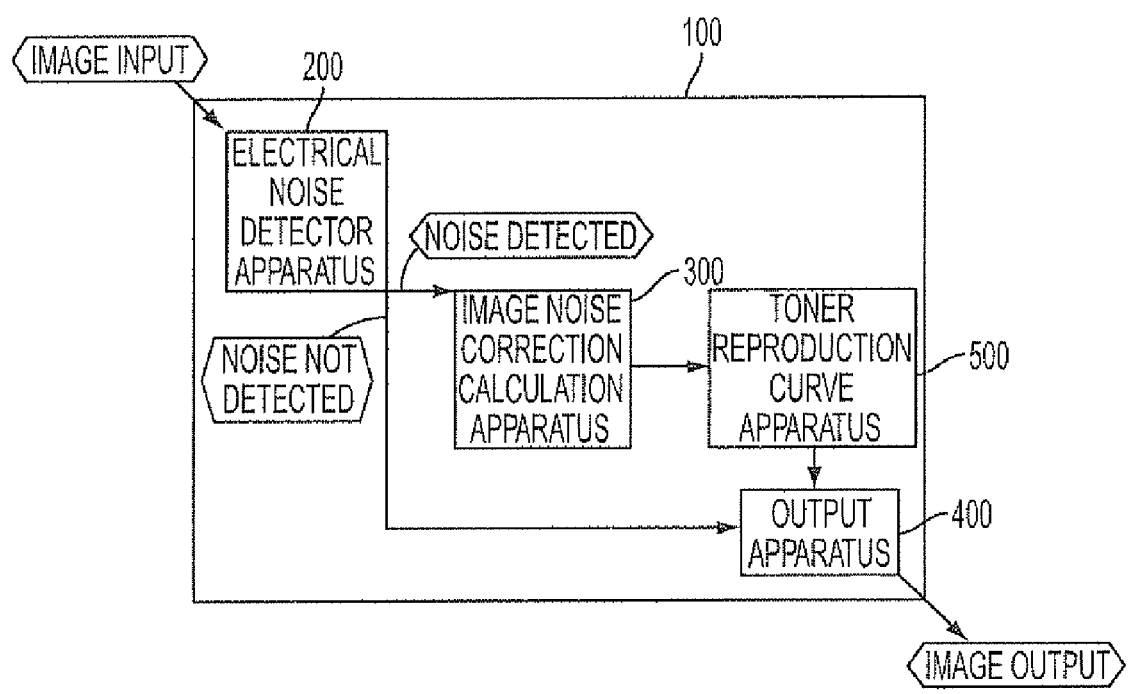
FIG. 3 is a diagram of an image apparatus and a toner reproduction curve apparatus that process an image according to an exemplary embodiment.

Further to the apparatus illustrated in FIG. 2, the embodiment of FIG. 3 discloses a toner reproduction curve (TRC) apparatus 500 that corrects for the electronic noise before output of the image. The TRC apparatus 500 may be a variety of actuators, including, but not limited to a raster output scanner (ROS). In particular, if it is known that banding is an artifact that is to be addressed, a ROS would be one acceptable manner of addressing the image noise. Of course numerous other noise correction techniques may be employed.

Figure 4:
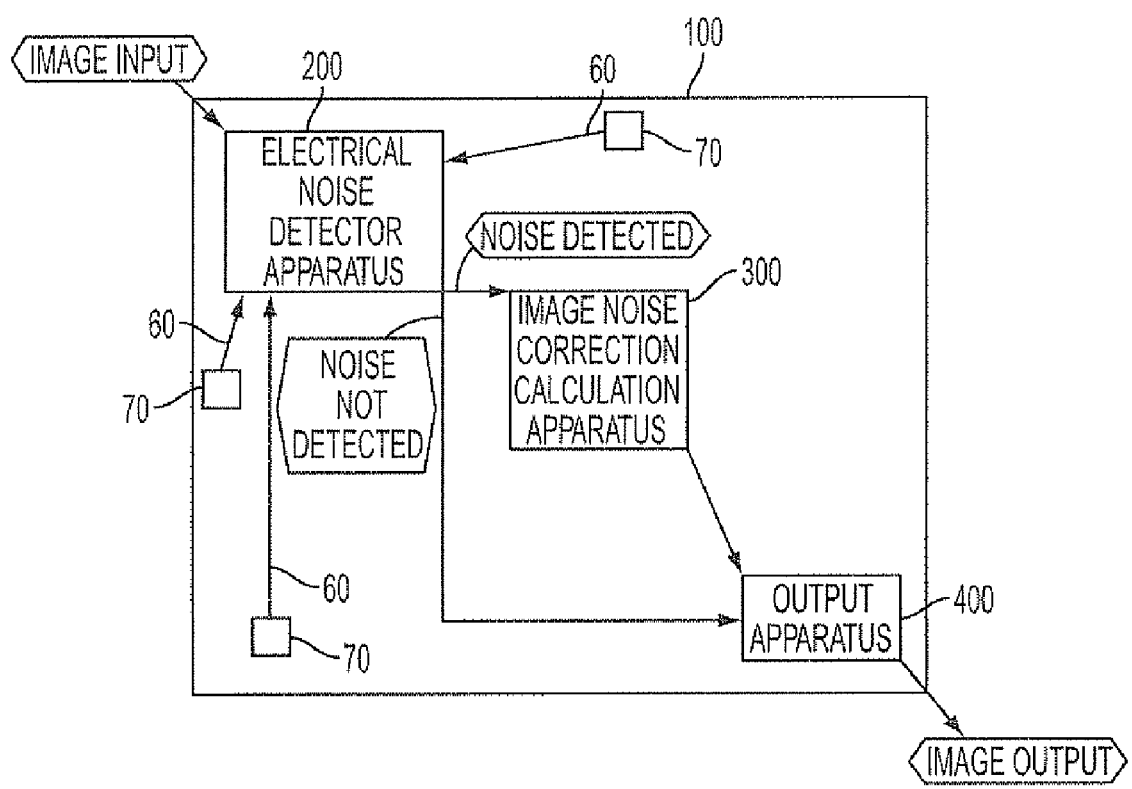
FIG. 4 is a diagram of an image apparatus and plurality of sensors that process an image according to an exemplary embodiment.

In the embodiment of FIG. 4, the END apparatus 200 of the image apparatus 100 is composed of a plurality of sensors 70, which respectively relate to various components of the image apparatus. The sensors are disposed throughout the image apparatus, particularly at known sources of noise. The sensors send signals 60 back to the END apparatus 200, so that the END apparatus 200 may compute an END calculation. As discussed above, the END calculation is then sent to an INCC apparatus 300, which computes an INCC. The INCC then is used to output an image, where the influence of electrical noise has been addressed.

Figure 5:
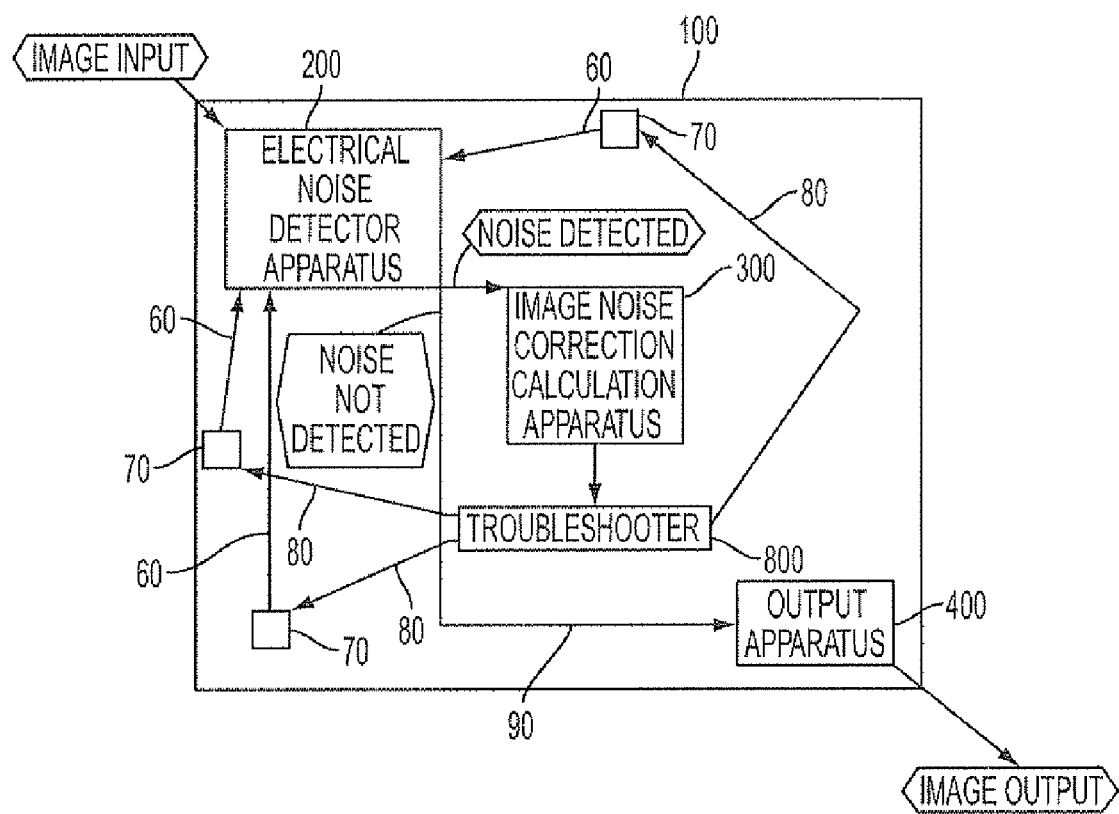
FIG. 5 is a diagram of an image apparatus and a troubleshooter that process an image according to an exemplary embodiment.

In the embodiment of FIG. 5, a troubleshooter 800 is illustrated. The trouble shooter 800 receives an INCC calculation from the INCC apparatus 300, which computes the INCC at least based on the END calculation calculated by the END apparatus 200. The troubleshooter 800 in this embodiment is shown in relationship with the plurality of sensors, such that the troubleshooter 800 is capable of directly addressing the specific components of the image apparatus that are sources of the electrical noise. The troubleshooter 800 is capable of performing a variety of correction functions, including, but not limited to individual or combinations of: identifying the sources of the electrical noise, fixing the sources of the electrical noise, suppressing or disabling the source of the electrical noise, compensating for the image noise that is caused by the electrical noise, or alerting a user of the image apparatus. The troubleshooter 800 may address these correction functions directly at the sources of the electrical noise by sending signals 80 directly to the sources of the electrical noise.

Further, once the troubleshooter 800 addresses the image noise, a confirmation signal 90 is sent to an output apparatus so that output of the image may take place. Also, note, however, that the troubleshooter 800 may also be in a relationship with the output device directly, depending on the type of and manner in which the electrical noise needs to be addressed.

Figure 6:
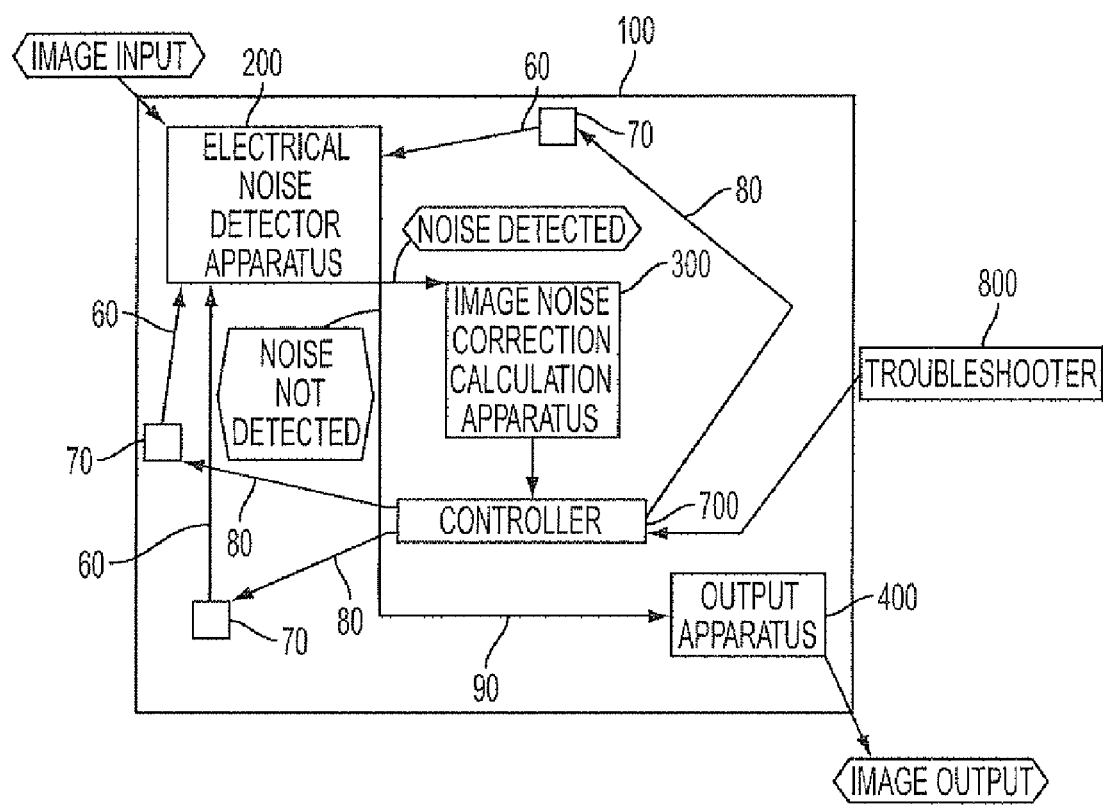
FIG. 6 is a diagram of an image apparatus and a detachable troubleshooter that process an image according to an exemplary embodiment.

In the embodiment of FIG. 6, the troubleshooter 800 may be associated with the image apparatus, although it is not necessarily a fixed part of the image apparatus. Through various devices, for example a central controller 700 in FIG. 6, a troubleshooter 800 may removably be associated with the image apparatus. This would allow the use of a troubleshooter 800 including multiple or various machines to be interchangeable. Any machine or device may act as the trouble shooter 800 as long as the machines are able to provide sufficient information with regards to the problem or problems that need to be modified, corrected and/or addressed.

In various embodiments, a loopback system may be implemented into any of the devices, systems or methods, wherein a controller recognizes that there is image noise in the image to be outputted. Upon such recognition, there is a loopback in the system to determine the source of the electrical noise at least partially causing the image noise, and such a system would be in a relationship with a troubleshooter type device in order to address the electrical noise as described above. In such a loopback system, a variety of parameters relating to image noise could be defined and identified for recognition by the loopback system. For example, deviations in the colors, tones, graininess, mottle, etc. could be specifically identified and addressed in a variety of manners as discussed above.

While various details have been described, these details should be viewed as illustrative, and not limiting. Various modifications, substitutes, improvements or the like may be implemented within the spirit and scope of the forgoing disclosure.

It will be appreciated that various of the above-disclosed and other features and functions, or alternatives thereof, may be desirably combined into many other different devices, systems or methods. Also, various presently unforeseen or unanticipated alternatives, modifications, variations or improvements therein may be subsequently made by those skilled in the art, and are also intended to be encompassed by the following claims.

What is claimed is:

1. A method for improving image quality output in an image apparatus, the method comprising:
    detecting electrical noise using an electrical noise detection apparatus that detects electrical noise from a plurality of components of the image apparatus and produces an electrical noise detection calculation based at least on the detected electrical noise;
    inputting the electrical noise detection calculation into an image noise correction calculation apparatus, which calculates an image noise correction calculation; and
    modifying an image output based on the image noise correction calculation,
    wherein the image apparatus is at least one of a printer, copier, document scanner and facsimile machine.

2. The method of claim 1, wherein the electrical noise detection apparatus comprises a plurality of sensors sensing electrical noise.

3. The method of claim 1, wherein the image noise correction calculation is input into an output apparatus.

4. The method of claim 1, wherein the electrical noise detection apparatus has at least one sensor for a high-voltage component of the image apparatus.

5. The method of claim 1, wherein the image noise correction calculation is output to a troubleshooter associated with the plurality of components of the image apparatus, wherein the troubleshooter addresses the image noise by at least one of:
    (i) identifying a source of the electrical noise, (ii) repairing the source of the electrical noise, (iii) compensating for an image noise, and (iv) shutting down the source of the electrical noise within the plurality of components of the image apparatus.

6. The method of claim 1, wherein the image noise correction calculation is output to a troubleshooter associated with a central controller of the image apparatus, wherein the central controller addresses the image noise by at least one of:
    (i) identifying a source of the electrical noise, (ii) repairing the source of the electrical noise, (iii) compensating for an image noise, (iv) shutting down the source of the electrical noise within the plurality of components of the image apparatus, and (v) sending an alert to an operator of the image apparatus.

7. The method of claim 1, wherein the image noise correction calculation is input into a toner reproduction curve apparatus.

8. An image apparatus that improves image quality output in the image apparatus, the apparatus comprising:
    at least one controller that detects electrical noise from a plurality of components of the image apparatus, and produces an electrical noise detection calculation based at least on the detected electrical noise;
    a calculator that calculates an image noise correction calculation based at least on the electrical noise detection calculation; and
    a device for modifying an image output based on the image noise correction calculation,
    wherein the image apparatus is at least one of a printer, copier, document scanner and facsimile machine.

9. The apparatus of claim 8, wherein the at least one controller includes a plurality of sensors sensing electrical noise.

10. The apparatus of claim 8, wherein the image noise correction calculation is input into an output apparatus.

11. The apparatus of claim 8, wherein the at least one controller has at least one sensor for a high-voltage component of the image apparatus.

12. The apparatus of claim 8, wherein the image noise correction calculation is output to a troubleshooter associated with the plurality of components of the image apparatus, wherein the troubleshooter addresses the image noise by at least one of:
    (i) identifying a source of the electrical noise, (ii) repairing the source of the electrical noise, (iii) compensating for an image noise, and (iv) shutting down the source of the electrical noise within the plurality of components of the image apparatus.

13. The apparatus of claim 8, wherein the image noise correction calculation is output to a troubleshooter associated with a central controller of the image apparatus, wherein the central controller addresses the image noise by at least one of:
    (i) identifying a source of the electrical noise, (ii) repairing the source of the electrical noise, (iii) compensating for an image noise, (iv) shutting down the source of the electrical noise within the plurality of components of the image apparatus, and (v) sending an alert to an operator of the image apparatus.

14. The apparatus of claim 8, wherein the image noise correction calculation is input into a toner reproduction curve apparatus.

15. An image system that improves image quality output in an image apparatus, the system comprising:
  a means for detecting electrical noise from a plurality of components of the image apparatus, and producing an electrical noise detection calculation based at least on the detected electrical noise;
  a means for calculating an image noise correction calculation based at least on the electrical noise detection calculation; and
  a means for modifying an image output based on the image noise correction calculation,
  wherein the image apparatus is at least one of a printer, copier, documents scanner and facsimile machine.

16. The system of claim 15, wherein the means for detecting electrical noise includes a plurality of means for sensing electrical noise.

17. The system of claim 15, wherein the means for detecting electrical noise has at least one means for sensing electrical noise for a high-voltage component of the image apparatus.

18. The system of claim 15, wherein the image noise correction calculation is output to a means for troubleshooting associated with the plurality of components of the image apparatus, wherein the means for troubleshooting addresses the image noise by at least one of:
  (i) identifying a source of the electrical noise, (ii) repairing the source of the electrical noise, (iii) compensating for an image noise, and (iv) shutting down the source of the electrical noise within the plurality of components of the image apparatus.

19. The system of claim 15, wherein the image noise correction calculation is directed to a means for troubleshooting associated with a means for centrally controlling an image apparatus, wherein the means for centrally controlling an image apparatus addresses the image noise by at least one of:
  (i) identifying a source of the electrical noise, (ii) repairing the source of the electrical noise, (iii) compensating for an image noise, (iv) shutting down the source of the electrical noise within the plurality of components of the image apparatus, and (v) sending an alert to an operator of the image apparatus.

20. The system of claim 15, wherein the image noise correction calculation is input into a toner reproduction curve apparatus.

21. A method for improving image quality output in an image apparatus, the method comprising:
  detecting electrical noise using an electrical noise detection apparatus that detects electrical noise from a plurality of components of the image apparatus and produces an electrical noise detection calculation based at least on the detected electrical noise, wherein the electrical noise detection apparatus has at least one sensor for a high-voltage component of the image apparatus;
  inputting the electrical noise detection calculation into an image noise correction calculation apparatus, which calculates an image noise correction calculation; and
  modifying an image output based on the image noise correction calculation.

22. An image apparatus that improves image quality output in the image apparatus, the apparatus comprising:
  at least one controller that detects electrical noise from a plurality of components of the image apparatus, and produces an electrical noise detection calculation based at least on the detected electrical noise, wherein the at least one controller has at least one sensor for a high-voltage component of the image apparatus;
  a calculator that calculates an image noise correction calculation based at least on the electrical noise detection calculation; and
  a device for modifying an image output based on the image noise correction calculation.

23. An image system that improves image quality output in an image apparatus, the system comprising:
  a means for detecting electrical noise from a plurality of components of the image apparatus, and producing an electrical noise detection calculation based at least on the detected electrical noise, wherein the means for detecting electrical noise has at least one means for sensing electrical noise for a high-voltage component of the image apparatus;
  a means for calculating an image noise correction calculation based at least on the electrical noise detection calculation; and
  a means for modifying an image output based on the image noise correction calculation.

* * * * *